United States Patent
Arndt

(10) Patent No.: US 7,500,072 B2
(45) Date of Patent: Mar. 3, 2009

(54) MIGRATING DATA THAT IS SUBJECT TO ACCESS BY INPUT/OUTPUT DEVICES

(75) Inventor: Richard Louis Arndt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 11/380,052

(22) Filed: Apr. 25, 2006

(65) Prior Publication Data

US 2007/0260839 A1 Nov. 8, 2007

(51) Int. Cl.
*G06F 12/00* (2006.01)
*G06F 13/00* (2006.01)
*G06F 13/28* (2006.01)

(52) U.S. Cl. ....................... 711/165; 711/154
(58) Field of Classification Search .............. None
See application file for complete search history.

(56) References Cited

U.S. PATENT DOCUMENTS

| | | | |
|---|---|---|---|
| 4,475,155 A | 10/1984 | Oishi et al. | |
| 5,634,099 A | 5/1997 | Andrews et al. | |
| 5,717,952 A | 2/1998 | Christiansen et al. | |
| 6,351,780 B1 | 2/2002 | Ecclesine | |
| 6,393,500 B1 | 5/2002 | Thekkath | |
| 6,421,744 B1 | 7/2002 | Morrison et al. | |
| 6,845,409 B1 | 1/2005 | Talagala et al. | |
| 6,931,471 B2 | 8/2005 | Arndt et al. | |
| 2002/0199040 A1 | 12/2002 | Irwin et al. | |
| 2003/0212839 A1 | 11/2003 | Sethi et al. | |
| 2004/0064601 A1 | 4/2004 | Swanberg | |
| 2004/0117519 A1 | 6/2004 | Smith | |
| 2004/0243738 A1 | 12/2004 | Day et al. | |
| 2006/0069818 A1 | 3/2006 | Mather et al. | |
| 2007/0260768 A1* | 11/2007 | Bender et al. | ................. 710/22 |

OTHER PUBLICATIONS

U.S. Appl. No. 11/050,332, filed Feb. 3, 2005, Arndt et al.

* cited by examiner

*Primary Examiner*—Kevin Verbrugge
*Assistant Examiner*—Eric S Cardwell
(74) *Attorney, Agent, or Firm*—Duke W. Yee; Casimer K. Salys; A. M. Thompson

(57) ABSTRACT

A computer implemented method and system for migrating data accessible by input/output (I/O) devices using direct memory access. A request is received to migrate data. The data is migrated from a source page to a destination page in response to the request to migrate the data. Read data for the direct memory access are fetched from the source page. Write data for the direct memory access are stored in both the source page and the destination page.

8 Claims, 5 Drawing Sheets

MIGRATING DATA THAT IS SUBJECT TO ACCESS BY INPUT/OUTPUT DEVICES

BACKGROUND OF THE INVENTION

1. Field of the Invention

The present application relates generally to the data processing field. More particularly the present application relates to migrating data that is subject to access by input/output devices.

2. Description of the Related Art

Reconfiguration of a computer system may be performed while the computer system is running. Doing so, however, frequently necessitates that data processing operations be disrupted. For example, if multiple operating systems are running on a computer, there may be a need to reallocate a block of memory being used by a first operating system so that it may be used by a second operating system. Traditionally, this situation has required that the first operating system stop using the block of physical memory before it is reallocated. As another example, when a problem is detected in a block of physical memory, it may be desirable to remove the memory from operation so that it can be replaced. Again, the operating system that was using the block of memory must stop using it during the replacement process.

A computer system may often be reconfigured without disrupting data processing operations by using virtual memory management mechanisms that are available in current operating systems. These mechanisms, however, are not satisfactory when the block of memory to be moved is subject to access by input/output (I/O) devices, commonly referred to as direct memory access (DMA). In particular, blocks of memory that are subject to access by I/O devices are conventionally "pinned," that is, exempted from being moved, because access to them is maintained by essentially endless I/O programs that run as long as the operating system runs; and it would be disruptive to the system to stop such an I/O program.

It is possible to invalidate an I/O address translation entry for a block of memory (also referred to as a "page") that is to be migrated. Then, if an I/O device were to attempt to access the page, the invalid translation entry would cause an I/O page fault to be reported and the I/O device driver would have to respond. That is, the driver would restart the I/O operation after the page again becomes available. In order for this procedure to work, however, the device drivers of all I/O devices that could possibly have access to the page would have to implement I/O page fault recovery code, which is not a practical solution.

Recognizing the inadequacies of prior mechanisms for migrating data subject to access by I/O devices, one solution involves a mechanism for migrating data in which DMA operations for I/O adapters that access the data being migrated is disabled for a short period of time. While this mechanism is effective in many applications, the industry standard PCI-E bus does not contain a mechanism for temporarily disabling DMA operations without adversely affecting other transfers to/from an I/O adapter.

SUMMARY OF THE INVENTION

The different illustrative embodiments provide a computer implemented method, data processing system, and computer usable program code for migrating data accessible by devices using direct memory access. The illustrative embodiments receive a request to migrate data and, responsive to the request, migrate the data from a source page to a destination page. The illustrative embodiments ensure read data for the direct memory access are fetched from the source page. The illustrative embodiments also ensure write data for the direct memory access are stored in both the source page and the destination page.

BRIEF DESCRIPTION OF THE DRAWINGS

The novel features believed characteristic of the embodiments are set forth in the appended claims. The embodiments, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
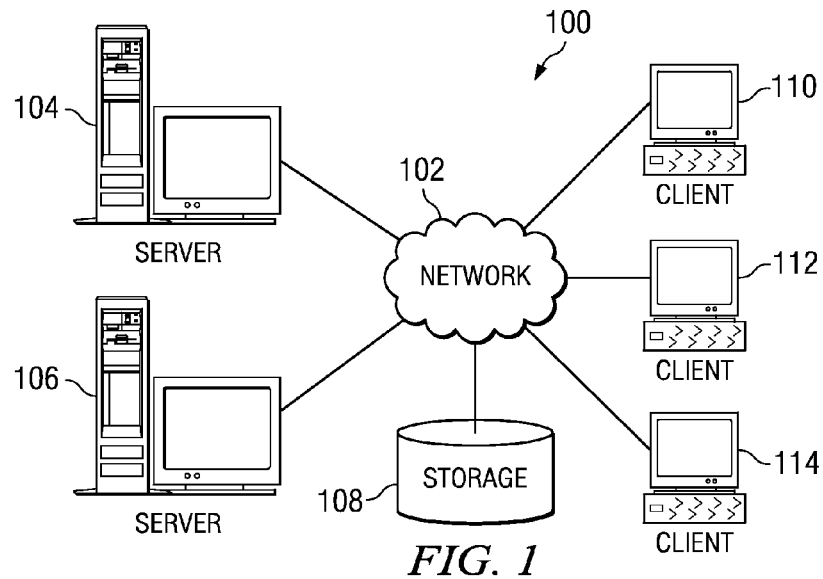
FIG. 1 depicts a pictorial representation of a network of data processing systems in which illustrative embodiments may be implemented.
Figure 2:
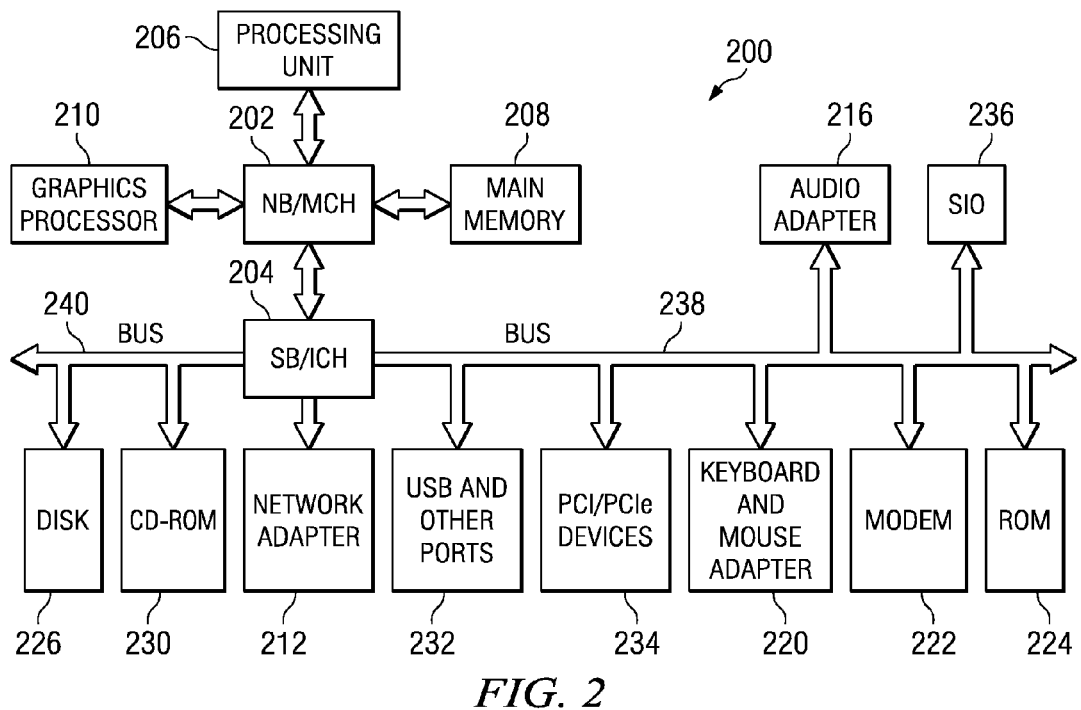
FIG. 2 depicts a block diagram of a data processing system in which illustrative embodiments may be implemented.

The illustrative embodiments provide for migrating data that is subject to access by input/output devices. With reference now to the figures and in particular with reference to FIGS. 1-2, exemplary diagrams of data processing environments are provided in which embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
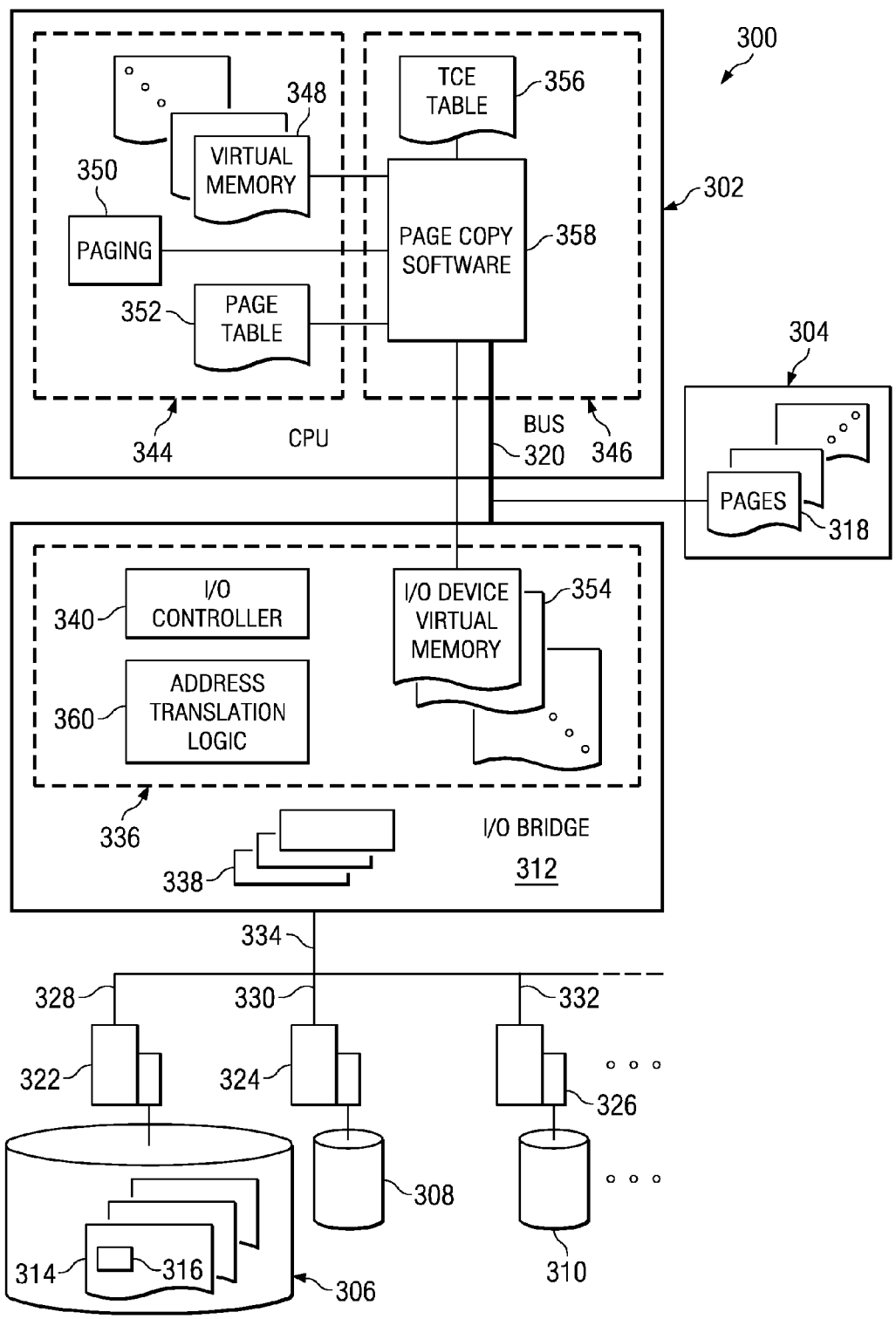
FIG. 3 depicts a block diagram that illustrates relevant details of a data processing system in accordance with an illustrative embodiment.

FIG. 3 depicts a block diagram that illustrates relevant details of a data processing system in accordance with an illustrative embodiment. The system is generally designated by reference number 300, and may be implemented in data processing system 200 in FIG. 2. Data processing system 300 generally includes processing unit 302, volatile memory 304, a plurality of I/O devices 306, 308, and 310, and I/O bridge 312. In the exemplary embodiment illustrated in FIG. 3, data processing system 300 employs a PCIe architecture, and I/O bridge 312 comprises a PCI Host Bridge (PHB).

As used herein, the term "I/O device" may include any of a variety of devices which interface to a computer system and provide information to the system and/or receive information from the system. Examples of I/O devices include a memory, mouse, keyboard, display, printer, optical scanner, etc. In the exemplary embodiment illustrated in FIG. 3, I/O device 306 comprises a non-volatile memory such as disk storage storing blocks 314 of data 316.

Blocks 314 of data 316 may be written from I/O device 306 to volatile memory 304. Blocks 314 are referred to as "physical pages" 318, with concern to their actual physical location in volatile memory 304. Volatile memory 304 is sometimes also referred to as "physical memory."

Physical pages 318 in volatile memory 304 are accessible by I/O devices 306, 308, and 310 and by processing unit ("CPU") 302 of data processing system 300. More specifically, physical pages 318 are coupled by bus 320 to I/O bridge 312 and I/O devices 306, 308, and 310 are coupled to I/O bridge 312 by I/O adapters 322, 324, and 326, respectively, and segments 328, 330, and 332 of I/O bus 334.

I/O bridge 312 includes I/O bridge logic 336, that arbitrates among the I/O devices, that is, that grants the I/O devices access one-at-a-time to I/O bus 334, and from I/O bus 334 to bus 320. I/O bridge 312 also includes I/O data buffers 338, for caching data 316 from physical pages 318 or from an I/O device, such as I/O device 306, responsive to requests by the I/O devices. I/O bridge logic 336 includes logic for handling the data buffering. In the illustrated embodiment, I/O bridge logic 336 also includes I/O controller 340, also called an I/O processor.

Data processing system 302 executes operating system and firmware instructions, images of which are represented in FIG. 3 in the data processing system as operating system 344 and firmware 346. Instructions for execution by data processing system 302 include instructions from firmware 346, instructions from operating system 344 that run with the support of firmware 346, and application instructions (not shown) that run with the support of firmware 346 and operating system 344. It should be appreciated that firmware 346 runs on data processing system 302 substantially independently of operating system 344, and provides a lower level of interface and therefore greater access to hardware components such as data processing system 302 than does operating system 344.

In certain respects, operating system 344 presents applications running on data processing system 302 a view of blocks 314 of data 316 as pages of virtual memory 348, so that the actual location of data 316 is fairly transparent, regardless of whether the data is in volatile memory 304 or on I/O device 306, for example. Accordingly, operating system 344 includes paging mechanism 350 and page table 352 for somewhat transparently moving data 316 in and out of volatile memory 304.

Concerning I/O device virtual memory 354, operating system 344 directs I/O bridge logic 336 to map blocks 314 of data 316 to physical pages 318 via entries in a translation control entry ("TCE") table 356. In the illustrative embodiment, firmware 346 provides services that are put to use for moving data from one of physical pages 318 to another of physical pages 318, so that the first page can be put to a different service or idled. To perform this function, operating system 344 finds a set of one or more entries for the first one of the physical pages 318 in TCE table 356. Then, operating system 344 directs firmware 346 component, such as page copy software 358, to copy the data from a first of physical pages 318 associated with a given page in I/O device virtual memory 354 to a second of physical pages 318, then change the associated mapping in TCE Table 356 such that future accesses to I/O device virtual memory 354 are directed to the second physical page. Page copy software 358 has a number of functions that will be described in detail hereinafter.

To understand TCE table 356, consider that I/O devices 306, 308, and 310 each have their own view of data 316 as pages of I/O device virtual memory 354, similar to the virtual memory view of data processing system 302. I/O bridge logic 336 presents this view to I/O devices 306, 308, and 310. To maintain this view, the entries (not shown in FIG. 3) in TCE table 356 map blocks 314 of data 316 to pages in I/O device virtual memory 354. Accordingly, the I/O devices may refer to data 316 by reference to a page in I/O device virtual memory 354 regardless of the actual location of the data, that is, regardless of which of physical pages 318 may be currently storing the data.

I/O bridge 312 provides I/O bridge logic 336 that lies between bus 320 and I/O bus 334. Memory requests on I/O bus 334 come in from I/O devices with virtual addresses to reflect I/O device virtual memory 354. Address translation logic 360 effectively accesses TCE table 356 (which is kept in I/O device virtual page order) to determine the physical page address that it should apply to bus 320 in order to access the correct one of physical pages 318 associated with the memory request from I/O bus 334.

Figure 4A:
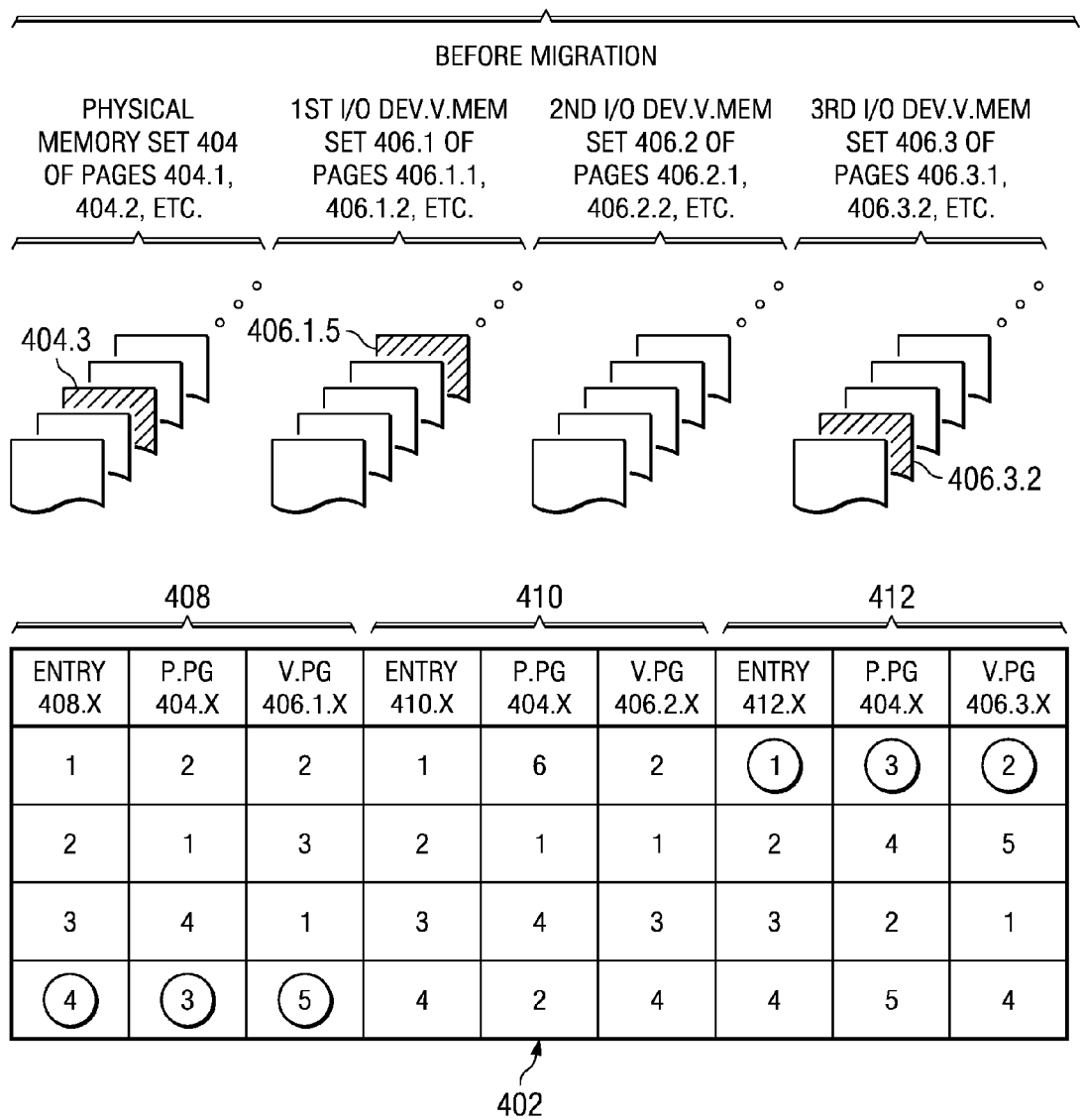
FIG. 4A depicts a diagram that schematically illustrates an example of migrating data before a migration in accordance with an illustrative embodiment.

FIG. 4A depicts a diagram that schematically illustrates an example of migrating data before a migration in accordance with an illustrative embodiment. TCE table 402, a number of physical pages 404, and I/O device virtual memory pages 406 are shown in more detail to illustrate an example of migrating data from a first one of physical pages 404, according to an illustrative embodiment. TCE table 402 may be a TCE table, such as TCE table 356 of FIG. 3, physical pages 404 may be physical pages, such as physical pages 318 of FIG. 3, and I/O device virtual memory pages 406 may be pages such as those in I/O device virtual memory 354 of FIG. 3. Specifically, as shown in FIG. 4, individual ones of physical pages 404 may be referred to as 404.1, 404.2, etc.

In the illustrated example, data from page 404.3 is targeted for migrating. I/O device virtual memory pages 406 are shown from the viewpoint of respective I/O devices, etc. That is, a first set of I/O device virtual memory pages 406.1 is for a first I/O device, such as disk 306 of FIG. 3, a second set of pages 406.2 is for a second I/O device, such as device 308 of FIG. 3, and a third set 406.3 is shown for a third I/O device, such as I/O device 310 of FIG. 3.

Sections 408, 410, and 412, include specific entries 408.X, 410.X, and 412.X in each section that are shown for TCE table 402. Sections 408, 410, and 412 correspond to respective I/O devices, such as I/O devices 306, 308, and 310 of FIG. 3. In this manner, the section in table 402 in which an entry is located indicates the I/O device which may access the physical page corresponding to that entry. In the example illustrated, the targeted physical page 404.3 is viewed by the first I/O device as I/O device virtual memory page 406.1.5, while it is viewed by the third I/O device as I/O device virtual memory page 406.3.2. Based on the lack of entries in the second section 410 of table 402 for the page 404.3, page copy software, such as page copy software 358 of FIG. 3, determines that the second I/O device has no mapping to page 404.3. That is, page 404.3 is not subject to access by the second I/O device.

Summarizing the above, the page copy software has identified the I/O devices which may access page 404.3 (and those which may not) by finding entries for physical page 404.3 in table 402. Specifically, in this example, the page copy software has determined that first I/O device and the third I/O device may access page 404.3.

In order to permit a direct memory access (DMA) operation, an I/O adapter, such as I/O device 345 of FIG. 3, writes data to or reads data from page 404.3, the illustrative embodiments recognize that direct memory access operations may continue during the time that the processor copies the migration source page to the migration destination page as long as the direct memory access read data are fetched from the source migration page and direct memory access write data are stored in both the migration source page and the migration destination page.

The illustrative embodiments further recognize that when the processor copies the migration source page to the migration destination page, the data in the source page may not be static. Accordingly, the data copy operation must copy an atomic piece of data from the source to the destination and then verify that the data in the source location is still the same.

According to an exemplary embodiment, a migration mode bit is defined in the TCE table. The lower order 12 bits in the TCE table are reserved for control purposes. The migration mode bit inserts a level of indirection in a TCE fetch process. The real address portion of the original TCE points to a 16 byte migration descriptor. The first 8 bytes of the 16 byte migration descriptor provides the real address of the source page in a TCE format, and the second 8 bytes provides the real address of the destination page also in a TCE format.

Turning on the migrate mode bit modifies the processor host bridge (PHB) processing of DMA operations as follows:

A. DMA Read Operation:
 1. Fetches the TCE and determines that the migration bit is set on;
 2. Fetches the first 8 bytes of the migration descriptor, which provides only one cycle of indirection;
 3. Fetches the DMA read data as specified by the source page TCE; and
 4. DMA read data is supplied by the source page.

B. DMA Write Operation:
 1. Fetches the TCE and determines the migrate bit is set to on;
 2. Fetches the entire 16 byte migration descriptor;
 3. Coherently writes the data to the source page, per source TCE, (Note: The cached copies must be invalidated before the next write.); and
 4. Coherently writes the data to the destination page, per destination TCE, (Note: The cached copies must be invalidated before the next write.).

In order to migrate data from one physical memory location to another physical memory location, the page copy software performs the following functions:

A. Sets the migration descriptor, one migration descriptor is needed for each physical block that is uniquely mapped within the migrating block;
B. Sets the TCE(s) that map into the migration block to access the appropriate migration descriptor;
C. Loops through the source page, for example, loops through the source page per source page word until the source word is the same after the store so as to catch the situation where a DMA write changes the data during copying:
 a. Loads the source word;
 b. Stores the word to the target page;
 c. Reloads the source word for test; and
 d. Ends the loop; and
D. Sets the TCE(s) to the value in the destination page field of the migration descriptor.

Figure 4B:
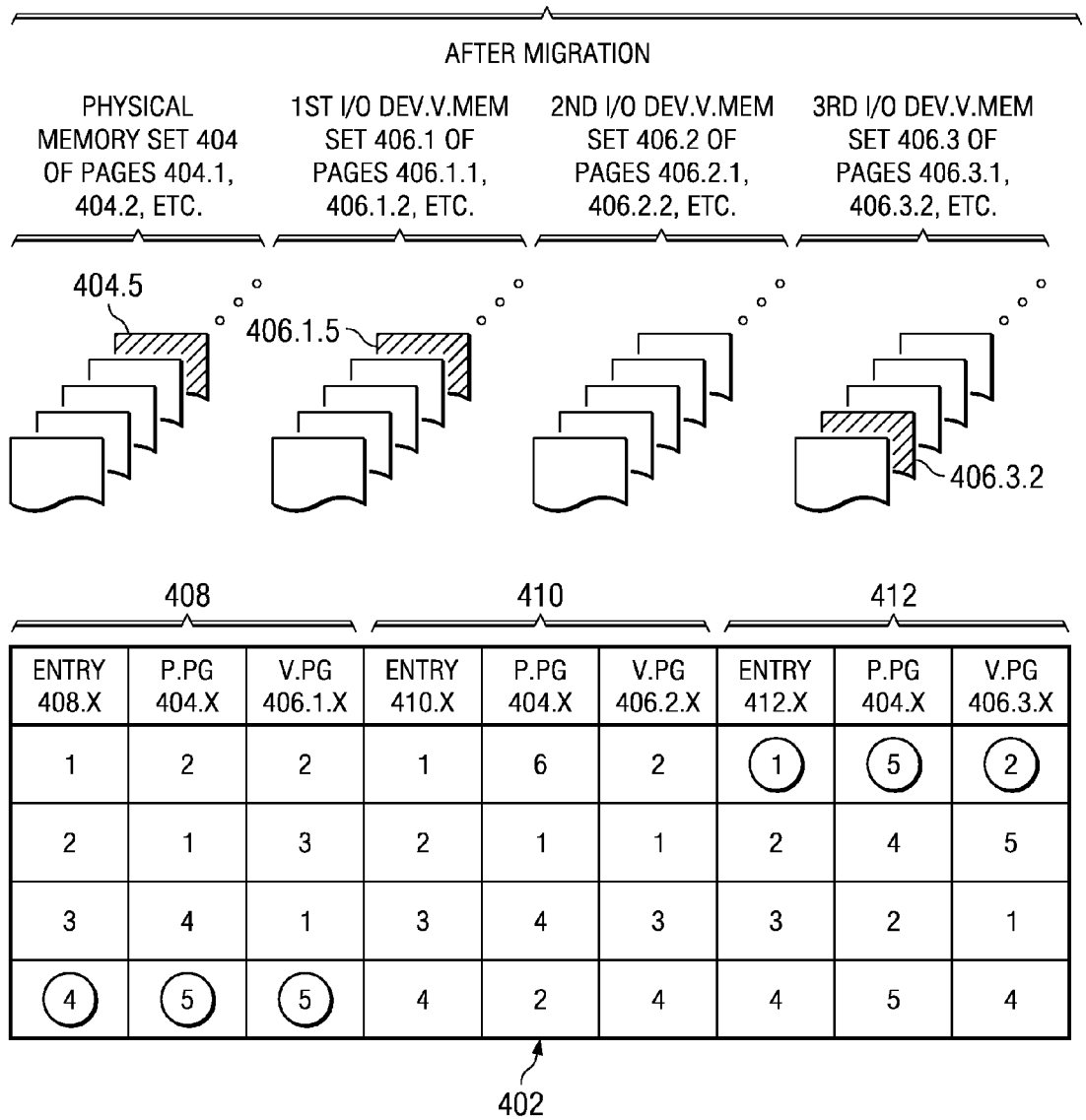
FIG. 4B depicts a diagram that schematically illustrates an example of migrated data after a migration in accordance with an illustrative embodiment.

Referring now to FIG. 4B, a diagram is depicted that schematically illustrates an example of migrated data after a migration in accordance with an illustrative embodiment. As shown in FIG. 4B, the page copy software moved the data from the first physical page 404.3 to a second physical page 404.5. Once the data is moved, the page copy software updates the set of entries in TCE table 402. As shown, after the update, entry 408.4 references virtual page 406.1.5 to the new physical page 404.5, and the entry 412.1 references virtual page 406.3.2 to the new physical page 404.5.

Figure 5:
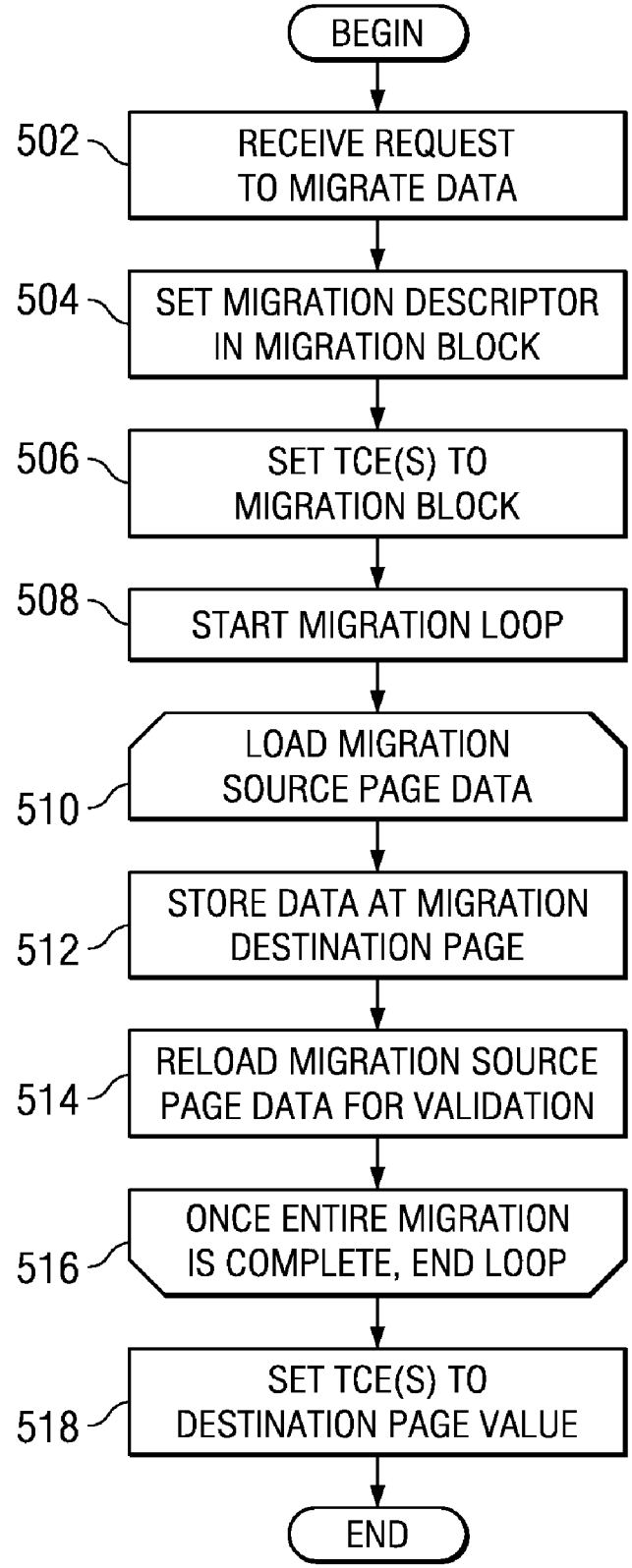
FIG. 5 depicts a flowchart that illustrates an operation of migrating data that is subject to access by I/O devices in accordance with an illustrative embodiment.

FIG. 5 depicts a flowchart that illustrates an operation of migrating data that is subject to access by I/O devices in accordance with an illustrative embodiment. In these examples the process may be implemented in a component, such as page copy software 358 of FIG. 3. As the operation begins, a request is received to move data from a physical page "X" to a physical page "Y" (step 502). The page copy software sets a migration descriptor in the translation control entry migration block that references the migration source page and the migration destination page (step 504). A migration descriptor is needed for each physical page that is being migrated. The page copy software then sets the one or more TCE(s) to point to the migration block so that the TCE(s) may access the migration descriptor(s) (step 506). Then, the page copy software starts a loop through the migration source page (step 508).

The page copy software loops through the migration source page n bytes at a time so that the migration store is the same, in order to catch and changes that may be made if a DMA write were to occur during the migration. Thus, the page copy software loads the migration source page data n bytes at a time (step 510). Stores the n bytes to the migration destination page (step 512). Reloads the migration source page data to determine the migration is valid (step 514). If the stored destination page is different, the reloaded migration source page data is stored at the destination page and the validation process repeats. Once all the data from the migration source page has been moved to the migration destination page, the loop ends (step 516). Therefore, once the migration starts any DMA write is made both to the migration source page as well as the migration destination page; however, the looping process ensures the migration source page data is the same as the migration destination page data. Finally, the page copy software sets the TCE(s) in the TCE table to the destination page value specified in the migration descriptor (step 518), with the operation ending thereafter.

Thus, the illustrative embodiments receive a request to migrate data and responsive to the request migrate the data from a source page to a destination page. The illustrative embodiments ensure read data for the direct memory access are fetched from the source page and ensure write data for the direct memory access are stored in both the source page and the destination page.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for migrating data accessible by input/output (I/O) devices using direct memory access (DMA) operations, the computer implemented method comprising:
responsive to a request to migrate the data in a migration source page, migrating the data from the migration source page to a migration destination page, the migrating of data occurring n bytes of data at a time, wherein n is an integer n>0,
during migration of the data from the migration source page, accessing the data from the migration source page of an I/O device by a DMA read operation; and
performing a DMA write operation of the accessed migration source page data to both the migration destination page and the migration source page of the I/O device.

2. The computer implemented method of claim 1, further comprising:
responsive to receiving the request to migrate the data, setting a migration descriptor in a migration block, the migration descriptor comprising a real address of the migration source page and a real address of the migration destination page;
setting a translation control entry (TCE) entry in a TCE table to point to the migration descriptor in the migration block, the TCE table comprising physical page entries;
validating a migration of the data; and
responsive to validating the migration of the data, setting the TCE entry in the TCE table to point to the migration destination page.

3. The computer implemented method of claim 2, wherein validating the migration of data comprises:
iteratively performing, until the migration of data is complete, actions comprising:
loading the migration source page data;
storing the migration source page data at the migration destination page;
reloading the migration source page data to form reloaded migration source page data; and
determining whether the reloaded migration source page data is different from the migration destination page data; and
responsive to the migration source page data being different from the reloaded migration destination page data, writing the reloaded migration source page data to the migration destination page data.

4. The computer implemented method of claim 3, further comprising:
responsive to the validation failing, storing the reloaded migration source page data at the migration destination page;
reloading the migration source page data to form new reloaded migration source page data;
validating the new reloaded migration source page data to the stored migration destination page data; and
responsive to the validation concurring, ending the data migration.

5. The computer implemented method of claim 2, further comprising:
setting a migration mode bit in a TCE table, the migration mode bit modifying a DMA write operation processing, the DMA write operation processing comprising;
fetching the TCE to determine the status of the migration mode bit;
responsive to the migration mode bit being set to on, fetching a migration descriptor, the migration descriptor providing a real address of the migration source page and the migration destination page; and
performing a coherent DMA write to both the migration source page and the migration destination page.

6. The computer implemented method of claim 5, wherein the migration mode bit inserts a level of indirection in the fetching.

7. The computer implemented method of claim 1, futher comprising:
setting a migration mode bit in a TCE table, the migration mode bit modifying a DMA read operation processing, the DMA read operation processing comprising;
fetching the TCE to determine the status of the migration mode bit;
responsive to the migration mode bit being set to on, fetching a portion of a migration descriptor, the portion of the migration descriptor providing a real address of the migration source page; and
performing a DMA read of the migration source page based on the migration descriptor.

8. The computer implemented method of claim 7, wherein the migration mode bit inserts a level of indirection in the fetching.

* * * * *